(12) United States Patent
Senda et al.

(10) Patent No.: US 10,898,939 B2
(45) Date of Patent: Jan. 26, 2021

(54) PUNCH PROCESSING METHOD FOR LAMINATED IRON CORE AND METHOD FOR MANUFACTURING LAMINATED IRON CORE

(71) Applicant: JFE STEEL CORPORATION, Tokyo (JP)

(72) Inventors: Kunihiro Senda, Tokyo (JP); Masanori Uesaka, Tokyo (JP); Yoshihiko Oda, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 413 days.

(21) Appl. No.: 15/538,530

(22) PCT Filed: Dec. 25, 2015

(86) PCT No.: PCT/JP2015/086190
§ 371 (c)(1),
(2) Date: Jun. 21, 2017

(87) PCT Pub. No.: WO2016/104686
PCT Pub. Date: Jun. 30, 2016

(65) Prior Publication Data
US 2017/0368590 A1 Dec. 28, 2017

(30) Foreign Application Priority Data

Dec. 26, 2014 (JP) .................. 2014-263758

(51) Int. Cl.
*H01F 3/04* (2006.01)
*B21D 28/14* (2006.01)
(Continued)

(52) U.S. Cl.
CPC ............. *B21D 28/14* (2013.01); *B21D 28/02* (2013.01); *B21D 28/10* (2013.01); *B21D 39/032* (2013.01);
(Continued)

(58) Field of Classification Search
CPC ......... Y10T 29/49009; Y10T 29/49012; Y10T 29/49078; Y10T 29/53143; Y10T 29/5317;
(Continued)

(56) References Cited

U.S. PATENT DOCUMENTS 5,923,112 A * 7/1999 Bertocchi ................. H01F 3/02
29/596
6,984,913 B2 * 1/2006 Neuenschwander .. B21D 28/22
29/596
(Continued)

FOREIGN PATENT DOCUMENTS

| CN | 1742419 A | 3/2006 |
|---|---|---|
| CN | 103035374 A | 4/2013 |

(Continued)

OTHER PUBLICATIONS

Chinese Office Action for Chinese Application No. 2015800702670, dated Jun. 7, 2018, with Concise Statement of Search Report, 8 pages.
(Continued)

*Primary Examiner* — Thiem D Phan
(74) *Attorney, Agent, or Firm* — RatnerPrestia

(57) ABSTRACT

A punch processing method for a laminated iron core includes sequentially feeding the steel sheets to a mold; and performing a plurality of processes in the mold, the plurality of processes includes fixing the steel sheets being stacked to each other at a first fixing part that is positioned outside a closed curved line corresponding to an outermost periphery of the laminated iron core and a second fixing part that is positioned in a portion that finally serves as the laminated iron core; and performing punch processing on the outermost periphery of the laminated iron core while the steel sheets are stacked.

4 Claims, 9 Drawing Sheets

(51) Int. Cl.
    *B21D 28/02*     (2006.01)
    *B21D 28/10*     (2006.01)
    *H02K 1/14*     (2006.01)
    *B21D 39/03*     (2006.01)
    *H01F 41/02*     (2006.01)
    *H02K 15/02*     (2006.01)
    *B60K 7/00*     (2006.01)
    *B60L 3/00*     (2019.01)

(52) U.S. Cl.
    CPC ..... *H01F 41/0233* (2013.01); *H01F 41/0246* (2013.01); *H01F 41/0266* (2013.01); *H02K 1/145* (2013.01); *H02K 1/148* (2013.01); *H02K 15/022* (2013.01); *B60K 7/0007* (2013.01); *B60L 3/0061* (2013.01); *B60L 2220/50* (2013.01); *Y10T 29/49078* (2015.01)

(58) Field of Classification Search
    CPC ..... H01F 41/02; H01F 41/0266; H02K 1/223; H02K 2201/09; B21D 28/10
    USPC .................. 29/609, 596, 598, 604, 605, 606
    See application file for complete search history.

(56) References Cited

U.S. PATENT DOCUMENTS

| | | |
|---|---|---|
| 7,352,101 B2 | 4/2008 | Fujita |
| 2005/0194858 A1 | 9/2005 | Ahn |

FOREIGN PATENT DOCUMENTS

| | | | |
|---|---|---|---|
| GB | 1353473 | A | 5/1974 |
| JP | 55156623 | A | 12/1980 |
| JP | 57156657 | A | 9/1982 |
| JP | 6423745 | A | 1/1989 |
| JP | 2603153503 | A | 5/2003 |
| JP | 2003274582 | A | 9/2003 |
| JP | 2005261038 | A | 9/2005 |
| JP | 2005348456 | A | 12/2005 |
| JP | 4046521 | B2 | 2/2008 |
| JP | 2012115893 | A | 6/2012 |
| JP | 2012115894 | A | 6/2012 |
| RU | 2316102 | C1 | 1/2008 |
| SU | 562222 | A3 | 6/1977 |

OTHER PUBLICATIONS

Extended European Search Report for European Application No. 15 873 254.5, dated Jul. 27, 2018, 6 pages.
Korean Office Action for Korean Application No. 10-2017-7016743, dated Aug. 13, 2018, with Concise Statement of Relevance of Office Action, 5 pages.
Russian Office Action for Russian Application No. 2017126492, dated Jun. 29, 2018, with Concise Statement of Relevance of Office Action, 11 pages.
International Search Report and Written Opinion for International Application No. PCT/JP2015/086190, dated Feb. 9, 2016—5 Pages.
Japanese Office Action for Japanese Application No. 2014-263758, dated May 22, 2017, with partial English translation—3 Pages.

\* cited by examiner

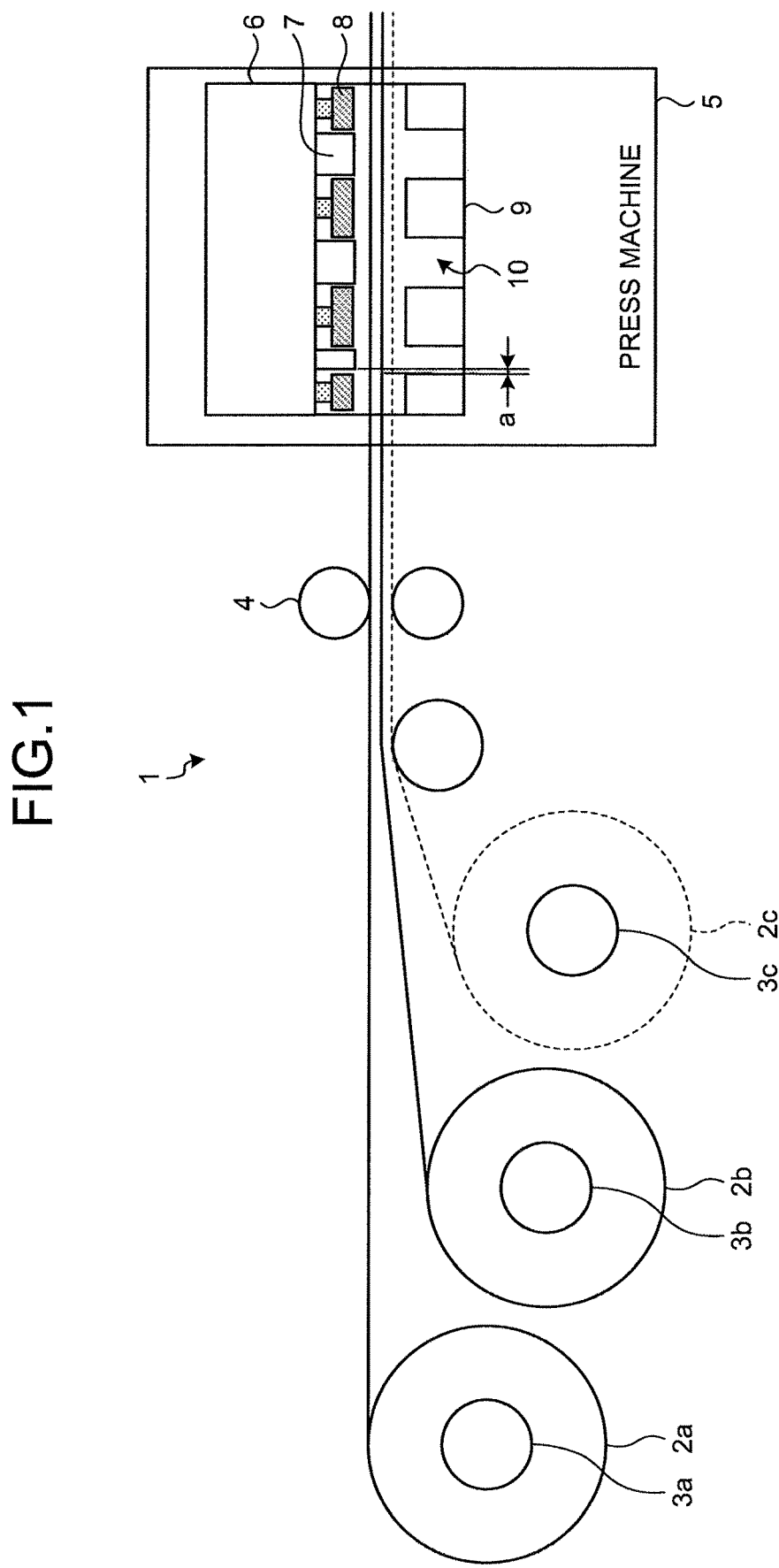

(a)

(b)

PUNCH PROCESSING METHOD FOR LAMINATED IRON CORE AND METHOD FOR MANUFACTURING LAMINATED IRON CORE

CROSS REFERENCE TO RELATED APPLICATIONS

This is the U.S. National Phase application of PCT/JP2015/086190, filed Dec. 25, 2015, which claims priority to Japanese Patent Application No. 2014-263758, filed Dec. 26, 2014, the disclosures of each of these applications being incorporated herein by reference in their entireties for all purposes.

TECHNICAL FIELD OF THE INVENTION

The present invention relates to a punch processing method for a laminated iron core and a method for manufacturing a laminated iron core.

BACKGROUND OF THE INVENTION

In recent years, iron cores have been downsized to reduce weight of motors and generators, mainly in electric vehicles and hybrid electric vehicles. Furthermore, the speed (frequency) of the motor and the generator is increased to secure the power thereof. Thus, from the viewpoint of reducing iron loss in the iron core, a demand for using an electrical steel sheet having a sheet thickness of 0.30 mm or less that is smaller in sheet thickness than before, as an electrical steel sheet for providing an iron core has been increased.

The base material of the iron core of the motor and the generator is an electrical steel sheet the sheet thickness of which is reduced to reduce iron loss. The iron core is manufactured by performing punch processing on the electrical steel sheet. In the punch processing, a processing mold is installed in a press machine. An iron core is manufactured by punching out portions of an iron core while a steel sheet that has been slit into a predetermined width is being fed by a coil feeding device and integrating the portions of the iron core by interlocking inside the mold, or by removing iron core segments on which the punch processing is performed from the mold and integrating the iron core segments using welding or bolt fixing. In the following, an iron core that is manufactured by laminating and integrating thin electrical steel sheets is referred to as a "laminated iron core".

In industrially manufacturing the laminated iron cores, a method of forming the shape of an iron core within a mold while sequentially feeding steel sheets to the subsequent pressing process, and removing the iron core segments from the steel sheet by punching out the outer periphery of the iron core in the final pressing process is generally adopted. A method of removing iron core segments from the steel sheet in the final pressing process, and integrating the laminated iron cores by fitting interlocking projections to each other using a lowering operation of a punch, is also adopted in the industrial production of iron cores using interlocking.

The pressing processes such as the above are generally used because they are excellent in productivity. However, in a normal punch processing, the iron core segment needs to be punched out one by one. Thus, as the sheet thickness of the steel sheet is reduced, the number of sheets required for the same laminated thickness is increased. This significantly reduces the efficiency. To solve this problem, technologies of punching out a plurality of steel sheets in a stacked state have been developed, and solutions for problems relating to the technologies have also been developed.

For example, for a problem of misalignment of steel sheets that occurs when the steel sheets are simultaneously fed to a mold in a stacked state, Patent Literature 1 and Patent Literature 2 disclose technologies for fixing the steel sheets to each other using interlocking or the like, in the initial pressing process that is performed inside the mold, prior to the punch processing. Furthermore, Patent Literature 3 discloses a technology of forming a combined engaging part for fixing the steel sheets to each other, and flattening a convex portion of the combined engaging part by using a push-back technique so that the convex shape of the combined engaging part will not be an obstruction in the laminating process. The conventional technologies such as the above are countermeasures against deterioration of dimensional accuracy that occurs when the steel sheets are punched out simultaneously. Furthermore, Patent Literatures 4 and 5 each discloses a technology of simultaneously performing punch processing on the steel sheets in a single pressing process while preventing an increase in sag and burr, by using a mold that includes a plurality of portions corresponding to a punch and a die.

PATENT LITERATURE

Patent Literature 1: Japanese Patent Application Laid-open No. S55-156623
Patent Literature 2: Japanese Patent Application Laid-open No. 2003-153503
Patent Literature 3: Japanese Patent Application Laid-open No. 2005-261038
Patent Literature 4: Japanese Patent Application Laid-open No. 2012-115893
Patent Literature 5: Japanese Patent Application Laid-open No. 2012-115894
Patent Literature 6: Japanese Patent Application Laid-open No. 2005-348456

SUMMARY OF THE INVENTION

Deterioration of magnetic characteristics of an iron core is the problem that occurs when the stacked steel sheets are simultaneously punched out. In general, in the punch processing, a punched end portion is subject to strong plastic deformation, and a plastic strain remains around the punched end portion, which causes the magnetic characteristics to be deteriorated. Furthermore, when the deterioration amount of the magnetic characteristics is quantitatively evaluated, the deterioration of the magnetic characteristics cannot be explained by the plastic strain alone. Thus, the elastic strain that remains in addition to the plastic deformation also supposedly affects the deterioration of the magnetic characteristics. In this manner, although the punch processing is excellent in productivity, there is a problem of deteriorating the magnetic characteristics of the iron core. In particular, when the punch processing is performed on the stacked steel sheets, the plastic deformation portion is widely increased because the binding force between the steel sheets is weak. Consequently, the magnetic characteristics of the iron core will be deteriorated, compared to when the punch processing is performed on each steel sheet.

However, in the conventional technologies, only the deterioration of the dimensional accuracy of the iron core and the increase in the sagging amount and burr amount that are caused by the punch processing have been taken into consideration, and an improvement on the deterioration of the magnetic characteristics of an iron core is not provided. More specifically, in the technology disclosed in Patent Literature 3, the problem of deterioration of the magnetic characteristics of the iron core caused by the punch processing on the laminated steel sheets is not taken into consideration; and in addition, the mold mechanism becomes complicated because the technology in Patent Literature 3 requires an extra process referred to as push-back, which leads to disadvantages in cost and maintenance. Furthermore, to fix the iron cores to each other, interlocking is required in addition to the combined engaging part. Thus, the iron cores inevitably involve the deterioration of the magnetic characteristics thereof because they are affected by both processes of the combined engaging part and interlocking. Furthermore, in the technologies disclosed in Patent Literatures 4 and 5, the punch processing is not performed on the steel sheets in a directly stacked state. Thus, although Patent Literatures 4 and 5 are advantageous against the deterioration of the magnetic characteristics, the cost of the mold is significantly increased because the mold structure becomes complicated. Furthermore, a technology of efficiently integrating and joining the iron core segments that are punched out using a plurality of punches and dies has not yet developed.

To perform the punch processing on the stacked steel sheets, Patent Literature 6 discloses a technology of simultaneously performing the punch processing and interlocking, after welding the end surfaces of the steel sheets in the longitudinal direction, or after adhering 80% or more of the plane surface of the steel sheets with an adhesive layer having a thickness of 3 μm or more using half-cured resin. However, the technology has problems in productivity and manufacturing cost because it requires processing a wide area of the end surfaces of the steel sheets in the longitudinal direction or 80% or more of the plane surface.

The present invention has been made in view of the foregoing, and an object of the present invention is to provide a punch processing method for a laminated iron core and a method for manufacturing a laminated iron core capable of manufacturing a laminated iron core with high productivity, while preventing the deterioration of the magnetic characteristics of the laminated iron core to the minimum.

As a result of keen studies, the inventors of the present invention have found that; in a punch processing process on the outermost periphery of an iron core that has the longest circumferential length and the magnetic characteristics of which tend to deteriorate easily; it is possible to fix the steel sheets to each other and prevent the deterioration of the magnetic characteristics of the iron core that is caused by the punch processing, by performing the punch processing on the steel sheets in a stacked state, after fixing both sides of a closed curved line corresponding to a punched portion of the outermost periphery of the iron core in advance. The inventors of the present invention have conceived the present invention by examining the conditions required by a fixing part in detail, from the viewpoint of preventing the deterioration of the magnetic characteristics of the iron core that is caused by the punch processing.

To solve the problem and achieve the object, a punch processing method for a laminated iron core according to an embodiment of the present invention feeds a plurality of steel sheets to a mold and performs a plurality of processes in the mold including punch processing on the steel sheets in a stacked state, and includes: fixing the steel sheets being stacked to each other at a first fixing part that is positioned outside a closed curved line corresponding to an outermost periphery of the laminated iron core and a second fixing part that is positioned in a portion that finally serves as the laminated iron core; and performing punch processing on the outermost periphery of the laminated iron core.

Moreover, in the punch processing method for a laminated iron core according to an embodiment of the present invention, number of pairs of the first fixing part and the second fixing part in which a length of a line segment connecting the first fixing part with the second fixing part is 400 times or less of an average sheet thickness of the steel sheets, is 0.5 or more per 100 mm in length of the closed curved line on average.

Moreover, in the punch processing method for a laminated iron core according to an embodiment of the present invention, for the pair of the first fixing part and the second fixing part in which a length of a line segment connecting the first fixing part and the second fixing part is 400 times or less of an average sheet thickness of the steel sheets, when a shorter distance out of a distance between the first fixing part and the closed curved line and a distance between the second fixing part and the closed curved line is determined to be a distance between a fixing part and the closed curved line, an average value of the distance between the fixing part and the closed curved line is made to 250 times or less of the average sheet thickness of the steel sheets.

Moreover, in the punch processing method for a laminated iron core according to an embodiment of the present invention, a method of fixing the steel sheets at the second fixing part is a method of fixing using an interlocking projection to form a laminated iron core.

Moreover, a method for manufacturing a laminated iron core according to an embodiment of the present invention is a method of manufacturing a laminated iron core including: manufacturing a laminated iron core by laminating and integrating a steel sheet to which punch processing is performed using the punch processing method for the laminated iron core according to the present invention.

The punch processing method for a laminated iron core and the method for manufacturing a laminated iron core according to the present invention can manufacture a laminated iron core with high productivity, while preventing the deterioration of the magnetic characteristics of the laminated iron core to the minimum.

BRIEF DESCRIPTION OF THE DRAWINGS

FIG. 1 is a schematic view illustrating a configuration of a punch processing device.

FIG. 4-1 is a schematic view illustrating a configuration of the stator iron core and the fixing parts.

FIG. 4-2 is a schematic view illustrating a configuration of the stator iron core and the fixing parts.

DETAILED DESCRIPTION OF EMBODIMENTS OF THE INVENTION

Hereinafter, a punch processing method for a laminated iron core and a method for manufacturing a laminated iron core according to the present invention will be described, with reference to the accompanying drawings.

Applicable Range

First, an applicable range of the present invention will be described with reference to FIG. 1.

Figures 1, 4:
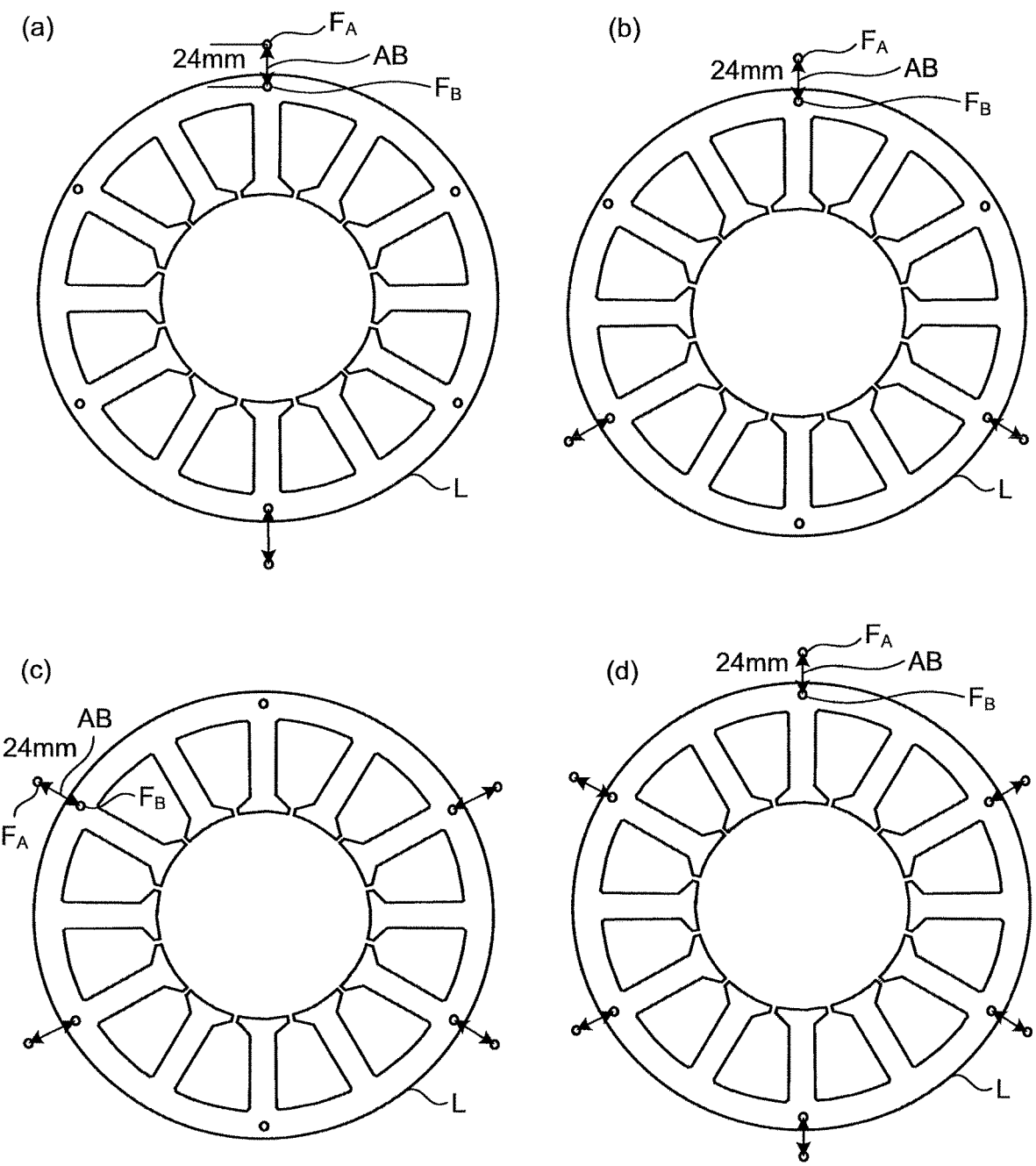
Figures 2, 4:
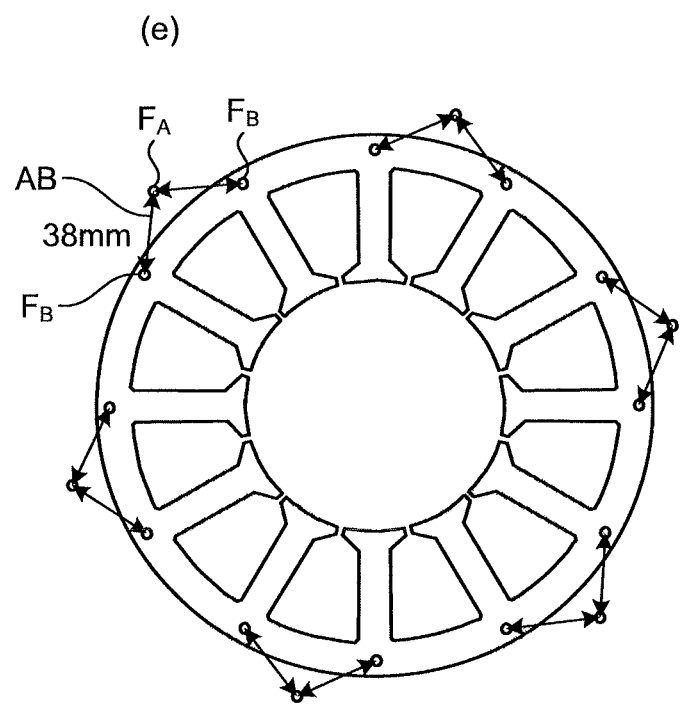

The present invention can be applied to a punch processing device 1 as illustrated in FIG. 1. More specifically, the punch processing device 1 illustrated in FIG. 1 is a device: that delivers a plurality of steel sheets 2a to 2c that are wound into a coil shape after being slit into a predetermined width, using delivering devices 3a to 3c; that continuously inserts the steel sheets 2a to 2c in a stacked state into a press machine 5 using a pinch roll 4; and that continuously performs punch processing on the steel sheets 2a to 2c using a mold 6 having a plurality of pressing process, in the press machine 5. In FIG. 1, reference numerals 7, 8, 9, and 10 respectively indicate a punch, a sheet holder, a die, and a die hole. The reference character a indicates a gap (clearance) between a side surface of the punch 7 and a side surface of the die hole 10.

By applying the present invention to the punch processing device 1 illustrated in FIG. 1, it is possible to produce an iron core having excellent magnetic characteristics at high efficiency. Furthermore, it is possible to improve the productivity when the present invention is applied to a punch processing process on an electrical steel sheet having a sheet thickness of 0.30 mm or less, the production efficiency of which is significantly reduced when a normal punch processing is performed. Furthermore, a high effect can be obtained when the present invention is applied to manufacturing various laminated iron core products that are laminated and produced after the punch processing is performed, more specifically, in particular manufacturing iron cores for motors and generators in which the magnetic characteristics of the iron core will be improved by reducing strain accumulated in a punched end portion.

Fixing Parts for Steel Sheets Before Punch Processing

Fixing parts for steel sheets prior to the punch processing of the present invention will now be described.

In the punch processing of an iron core, when a portion with a large outer diameter is to be punched out, a deformation amount around the punched end portion is large, and the magnetic characteristics easily deteriorate. In particular, when the punch processing is performed on the outermost periphery of the iron core, the circumferential length to be processed at a time is long, and in addition, for a stator iron core, the inner periphery side (inside of the teeth tip end portion) thereof is punched out, and thus the punch processing is performed on the outermost periphery with the binding force (rigidity) inside the steel sheet itself lowered. Consequently, introduction of strain easily occurs in the punched end portion. Thus, when the punch processing is performed on the steel sheets in a stacked state, the magnetic characteristics of the iron core easily deteriorate during the punch processing on the outermost periphery.

Consequently, in the present invention, for example, as illustrated in FIG. 2(a), a fixing part $F_A$ is disposed outside a closed curved line L corresponding to the outermost periphery of the iron core, and at the same time, a fixing part $F_B$ is disposed on a portion inside the closed curved line L that is the iron core. Thus, the bonding force between the steel sheets is increased when the stacked steel sheets are punched out, and a portion around the boundaries of the steel sheets is less deformed when the portion is deformed while being pulled into the clearance. This can prevent the deterioration of the magnetic characteristics.

To obtain such effects, the steel sheets need to be fixed to each other without fail at the fixing part $F_A$ and the fixing part $F_B$, before the punch processing is performed on the outermost periphery. Thus, the steel sheets need to be fixed to each other at the fixing part $F_A$ and the fixing part $F_B$ in the process performed inside the mold, before the punch processing is to be performed on the outermost periphery. Furthermore, because the fixing part $F_A$ is disposed outside the outermost periphery of the iron core, the fixing part $F_A$ also increases the rigidity of the entire steel sheets when the stacked steel sheets are fed inside the mold. Thus, the fixing part $F_A$ also prevents a failure that occurs when the electrical steel sheets having a thin sheet thickness are stacked and being fed.

Due to the above-described reasons, it is preferable to dispose the fixing part $F_A$ outside the closed curved line L corresponding to the outermost periphery of the steel sheets, and dispose the fixing part $F_B$ on a portion that is the iron core, and then perform the punch processing on the outermost periphery after the subsequent process inside the mold. It is to be noted that the fixing part $F_A$ and the fixing part $F_B$ may be provided simultaneously in the process performed inside the mold, or may be provided in separate processes. Alternatively, one of the fixing part $F_A$ and the fixing part $F_B$ may be provided before the other. However, to increase the rigidity of the entire steel sheets, it is preferable to provide the fixing part $F_A$ first, because the fixing part $F_A$ that is placed outside the outermost periphery has a higher effect.

Positions to Fix Steel Sheets to Each Other: Distance Between Fixing Part $F_A$ and Fixing Part $F_B$ The following explains the distance between the fixing part $F_A$ and the fixing part $F_B$.

In the present invention, when the punch processing is performed on the stacked steel sheets, portions for fixing the steel sheets to each other are provided on both sides of a line (line segment or closed curved line) that is to be cut by the punch processing. This makes it possible to minimize the deformation of the end portion of the steel sheets during the punch processing, and prevent the deterioration of the magnetic characteristics of the iron core. For example, in the punch processing of a stator iron core illustrated in FIG. 3(a), the closed curved line L corresponds to the outermost periphery of the stator iron core, and the fixing part $F_A$ is disposed on a portion that is to be discarded as a residual part of the punch processing, and the fixing part $F_B$ is disposed in the portion that is the iron core.

When the punch processing is performed without the laminated steel sheets being bound (or under a weak binding condition), the deformation amount of the steel sheets is increased when the steel sheets are pulled into the clearance. Consequently, the magnetic characteristics will be deteriorated. On the other hand, the punch processing performed after fixing the stacked steel sheets at the positions on both sides of the closed curved line L can prevent the deformation of the end portion of the iron core at the vicinity of the punched end portion. This makes it possible to prevent the deterioration of the magnetic characteristics of the iron core.

To obtain the above effects, the fixing part $F_A$ and the fixing part $F_B$ need to be brought close to each other sufficiently enough. Furthermore, due to the above-described reasons, it is preferable to set a single intersection between a line segment AB connecting the fixing part $F_A$ with the fixing part $F_B$, and the entire closed curved lines L to which the punch processing is to be performed. When there are a plurality of shearing portions on the line segment AB, the effect of binding the steel sheets to each other during the punch processing is divided, and the effects of the present invention cannot be obtained. Furthermore, the deformation amount of the steel sheets caused by the punch processing depends on the sheet thickness of the steel sheets, and the rigidity of the steel sheets is reduced as the sheet thickness is reduced. Consequently, the deformation amount (in this example, a degree of deterioration relative to that when a single steel sheet is punched out) on the punched end portion will be increased.

Figure 5:
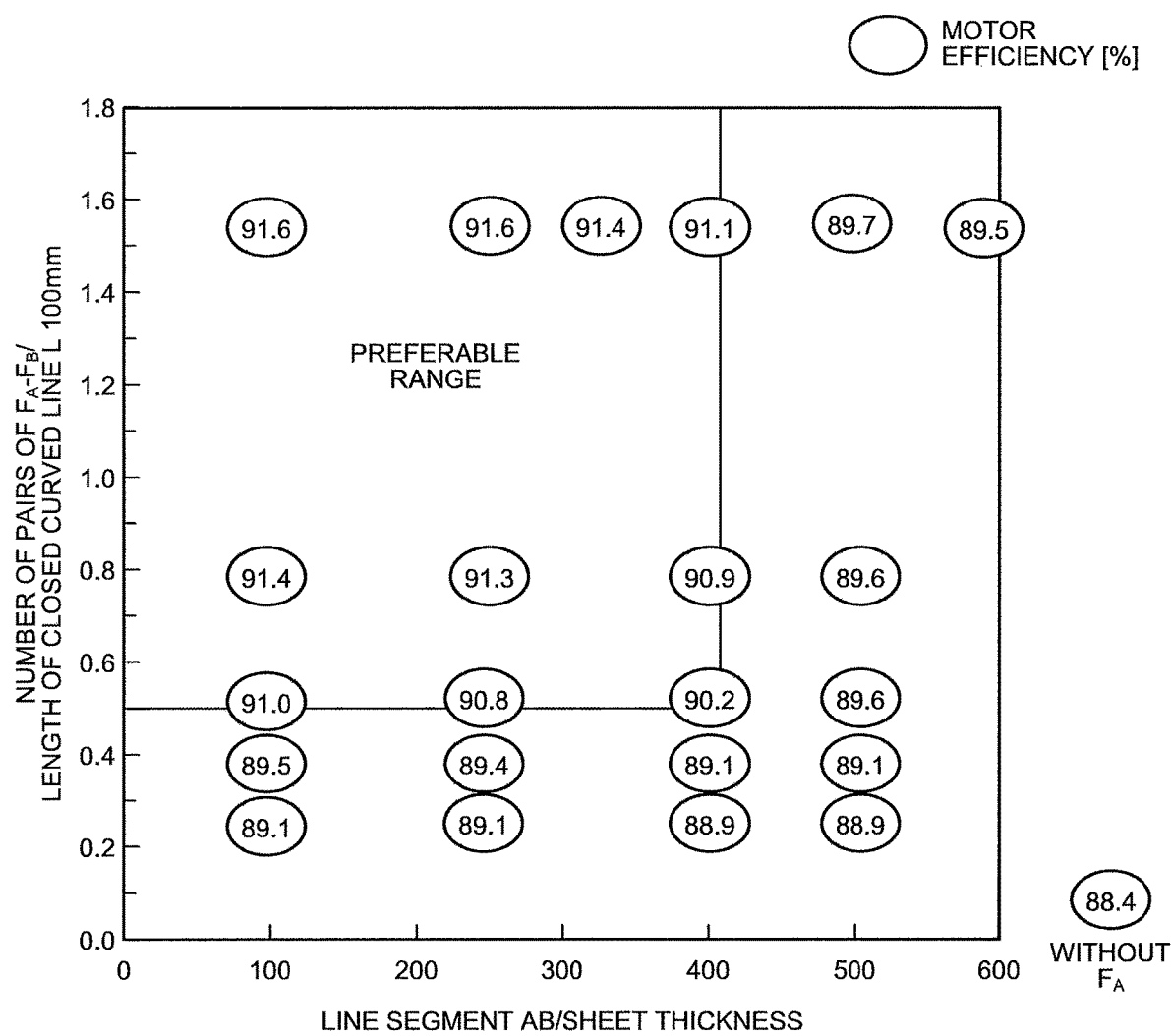
FIG. 5 is a diagram illustrating a relation of the length of a line segment AB, the number of pairs of fixing parts $F_A$ and $F_B$ per unit length of a closed curved line L, and motor efficiency.

For the above-described reasons, it is possible to prevent the magnetic characteristics of the iron core by setting the length of the line segment AB connecting the fixing part $F_A$ with the fixing part $F_B$ to a certain value or less, the value corresponding to the average sheet thickness of the stacked steel sheets. More specifically, as illustrated in FIG. 5, it is possible to prevent the deterioration of motor efficiency by setting the length of the line segment AB to 400 times or less (preferably 250 times or less) of the average sheet thickness of the stacked steel sheets. It is to be noted that the fixing parts $F_A$ and $F_B$ may be disposed so that the line segment AB and the closed curved line L do not necessarily cross each other at right angles, as illustrated in FIG. 4-2(e).

Furthermore, to obtain the above-described effects, a pair of the fixing parts $F_A$ and $F_B$ (a pair of the fixing parts $F_A$ and $F_B$ in which the length of the line segment AB is 400 times or less of the average sheet thickness of the stacked steel sheets) that satisfies the above-described conditions needs to be available at a predetermined ratio or more, in the closed curved line L. In the results illustrated in FIG. 5, the preferable range of the number of pairs of the fixing parts $F_A$ and $F_B$, in which the length of the line segment AB is 400 times or less of the average sheet thickness of the stacked steel sheets, is 0.5 or more per 100 mm in length of the closed curved line L.

Figure 8:
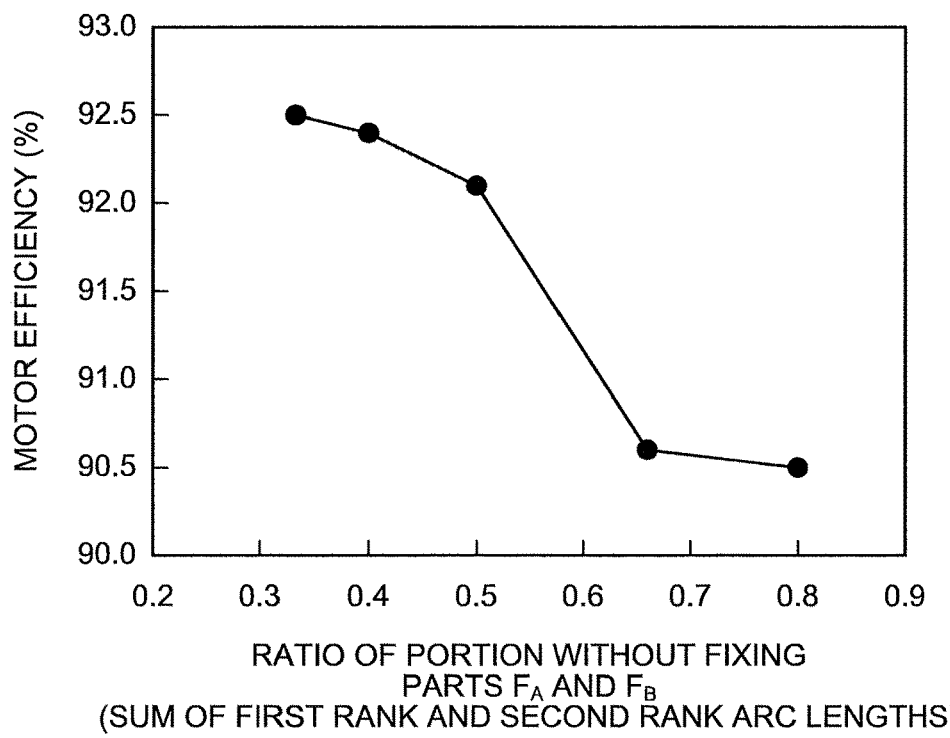
FIG. 8 is a diagram illustrating a relation between a ratio of a portion in the closed curved line L without the fixing parts $F_A$ and $F_B$, and the motor efficiency.

When the fixing parts $F_A$ and $F_B$ are disposed as illustrated in FIG. 4-2(e), a single fixing part $F_A$ constitutes two or more pairs of the fixing parts $F_A$ and $F_B$. In such a case, the single fixing part $F_A$ can prevent the deformation during the punch processing, by serving as a constituent of two or more pairs of the fixing parts $F_A$ and $F_B$ simultaneously. Thus, the above-described pair can be supposedly the pair of the fixing parts $F_A$ and $F_B$ in the closed curved line L. Furthermore, when the pairs of the fixing parts $F_A$ and $F_B$ that satisfy the conditions relating to the line segment AB are distributed unevenly relative to the closed curved line L, it is difficult to obtain the desirable effects. As illustrated in FIG. 8, when the ratio of the length of a portion in the closed curved line L without the fixing parts $F_A$ and $F_B$ (sum of arc lengths of the first rank arc length and the second rank arc length) exceeds 50% of the entire closed curved line L, the motor efficiency is reduced. Thus, it is preferable to make the ratio of the portion such as above less than 50%.

Positions to Fix Steel Sheets to Each Other: Distance Between Fixing Parts $F_A$ and $F_B$, and Closed Curved Line L Next, the distance between the fixing parts $F_A$ and $F_B$, and the closed curved line L will be described.

Figure 7:
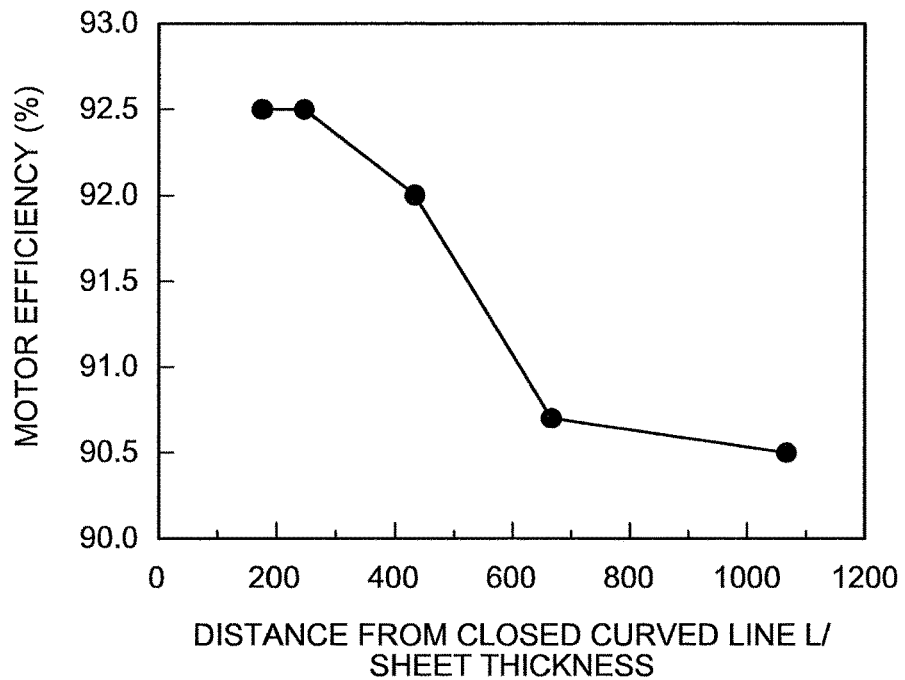
FIG. 7 is a diagram illustrating a relation of distance between the closed curved line L and the fixing parts $F_A$ and $F_B$, and the motor efficiency.

A higher effect can be obtained, by limiting the length of the line segment AB corresponding to the average sheet thickness of the stacked steel sheets (400 times or less of the average sheet thickness), as well as by providing the fixing parts $F_A$ and $F_B$ such as the above at positions close to the closed curved line L. As illustrated in FIG. 7, it is possible to prevent the deterioration of the motor efficiency, by making the distance between the fixing parts $F_A$ and $F_B$, and the closed curved line L, to 250 times or less of the average sheet thickness of the stacked steel sheets. This is possibly because when a part where the laminated steel sheets are fixed to each other is brought close to the portion where the shearing process is performed, the deformation of the steel sheets at the clearance portion of the mold can be prevented. Consequently, it is possible to prevent the deterioration of the magnetic characteristics of the punched end portion. In this example, respective distances between the fixing parts $F_A$ and $F_B$ that are at both sides of the line segment AB and the closed curved line L are the length of a perpendicular line extending from each of the fixing parts to the closed curved line L (closest distance between the fixing part and the closed curved line). When the distances between the fixing parts $F_A$ and $F_B$ and the closed curved line L are varied, it is preferable to measure the distance between one of the fixing parts $F_A$ and $F_B$ that is closer to the closed curved line L, and the closed curved line L, and adopt the average value.

Method of Fixing Steel Sheets to Each Other

Next, a method of fixing the steel sheets to each other will be described.

In the present invention, a method such as a spot welding and a partial application of an adhesive may be applied as a method of fixing the steel sheets to each other. It is possible to assume that the deterioration of the magnetic characteristics can be prevented, by performing the method such as the spot welding and the partial application of an adhesive over a wide range on the steel sheets. However, if the area is increased, the productivity will be decreased. Thus, it is preferable to apply the above-described method on the number of portions as less as possible, and it is suitable to perform the above-described method under the conditions specified in the present invention.

The combined engaging part that is provided on the portion used as the iron core in the technology disclosed in Patent Literature 3 has a certain amount of area and is crushed by the push back. Thus, the combined engaging part and the surrounding area are subjected to strong processing. Consequently, the magnetic characteristics of the iron core are also significantly deteriorated in the combined engaging part. On the other hand, when the method of partially applying an adhesive is used, the magnetic characteristics of the iron core do not deteriorate. Furthermore, when the method of spot welding is used, a portion where the magnetic characteristics are deteriorated is limited to a small area. Thus, the adverse effect on the magnetic characteristics of the iron core is small.

Figure 9:
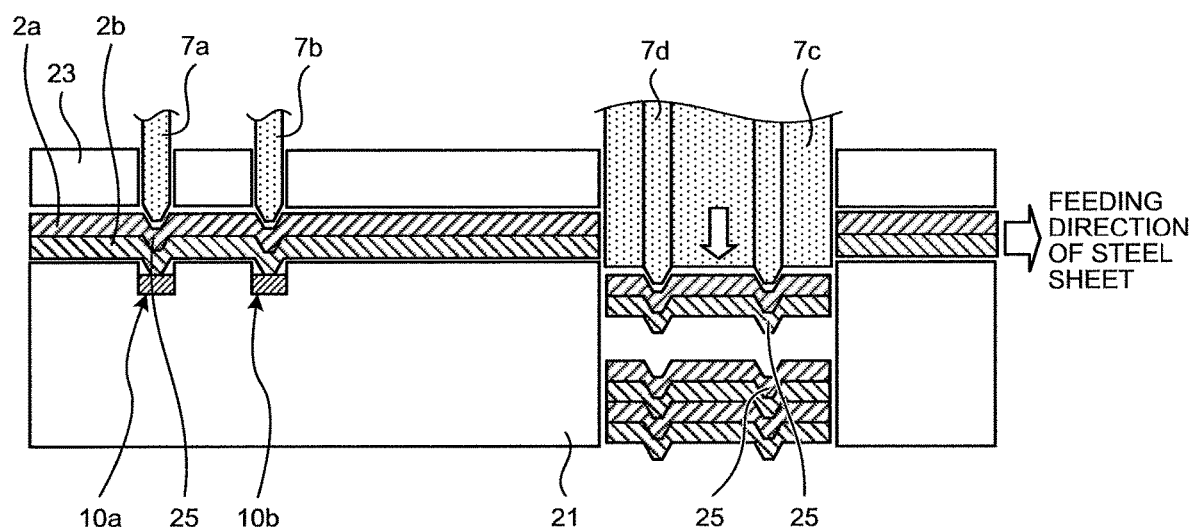
FIG. 9 is a schematic view for explaining a process for fixing steel sheets to each other using an interlocking projection.

Furthermore, from the viewpoint of productivity of the iron core, a method of fixing using interlocking is suitable to be used as the method of fixing the iron cores to each other, from the viewpoint of productivity. In the method of fixing using interlocking, the steel sheets can be fixed to each other before the punch processing, by providing a projection for interlocking in the final pressing process, while the steel sheets are in a stacked state. Furthermore, by using the interlocking projection in the final pressing process, the iron core segments are integrated by fitting the interlocking projections to each other inside the mold. Consequently, it is possible to manufacture a highly efficient iron core. FIG. 9 is a schematic view illustrating the above process.

More specifically, in the final pressing process illustrated in FIG. 9, the steel sheets 2a and 2b that are conveyed directly above holes 10a and 10b provided on a lower mold 21 are pressed into the holes 10a and 10b by punches 7a and 7b that are lowered from an upper mold 23. Thus, an interlocking projection 25 having a convex shape is formed on the lower side, and the steel sheets 2a and 2b are fixed to each other by the interlocking projection 25. Next, the steel sheets 2a and 2b are conveyed so that the interlocking projection 25 is placed directly below a punch 7c, and the punch processing is performed on the outermost periphery of the iron core by the punch 7c that is lowered from the upper mold 23. Then, the steel sheets 2a and 2b are stacked on the steel sheets being conveyed earlier so that the interlocking projections 25 are overlapped with each other. The interlocking projection 25 is then pushed and fitted into the interlocking projection 25 on the steel sheet below by an interlocking fastening punch 7d. Consequently, the steel sheets are fixed to each other.

The combined engaging part in the technology disclosed in Patent Literature 3 does not have a function of interlocking, because the combined engaging part is formed and crushed by the push back. Thus, interlocking for joining the steel sheets to each other needs to be provided separately. Consequently, the magnetic characteristics of the iron core are significantly deteriorated due to both processes of the combined engaging part and interlocking. On the other hand, in an embodiment of the present invention, the projection that is finally used for interlocking is also used as a unit for joining and fixing the steel sheets to each other in the middle of the punch processing. Thus, it is possible to prevent the deterioration of the magnetic characteristics of the iron core as much as a normal iron core having interlocking.

Due to the above-described reasons, the present invention adopts the method of fixing the steel sheets to each other using the method such as the spot welding and the partial application of an adhesive, with which the deterioration of the magnetic characteristics is small, at both sides of the portion (closed curved line L) where the shearing process is performed before the punch processing; or the method of fixing the steel sheets to each other by providing a projection that is finally used for interlocking for manufacturing the iron core, and by using the projection to fix the steel sheets to each other. The method of fixing using the adhesive, the method of fixing by spot welding, and the method of fixing by providing the interlocking projection may be combinedly used. For example, the method of fixing by spot welding may be used for the fixing part outside the iron core, and the method of fixing by providing the interlocking projection may be used to fix inside the iron core.

Method for Manufacturing Laminated Iron Core

The present invention is applicable as a method for manufacturing an integrally laminated iron core, by fixing the iron core segments that are punched out using the above-described method to each other inside the mold. The method for manufacturing the integrally laminated iron core includes a method using an adhesive, a method of welding the side surfaces of the laminated steel sheets, or a method of providing a projection for interlocking fastening in the midway process inside the mold, and joining the steel sheets to each other using the interlocking projection in the final pressing process.

Mold

The mold in the present invention is a mold for implementing the method described above, and has a function of fixing the steel sheets in a stacked state to each other by performing spot welding, by applying a quick drying adhesive, or by providing an interlocking projection on both sides of the closed curved line L that finally becomes the outermost periphery of the iron core. Then, by performing the shearing processing, namely the punch (shearing) processing, of separating the outermost periphery of the iron core segment from the steel sheets, in the final process of the processes performed inside the mold, it is possible to minimize the deterioration of the magnetic characteristics of the iron core that occurs when the punch processing is performed on the steel sheets in a stacked state.

EMBODIMENTS

First Embodiment

A stator iron core (outer diameter 200 mm, 12 slots, teeth width 14 mm, and back yoke width 10 mm) for a brushless direct current (DC) motor illustrated in FIGS. 2(a) and 2(b) was manufactured by simultaneously performing the punch processing on two electrical steel sheets having a sheet thickness of 0.20 mm and a sheet width of 210 mm using the device illustrated in FIG. 1, as well as by performing interlocking inside the mold. In the mold for performing the punch processing, the pressing processes of total of five sequential processes were performed one after another. The first process in the mold includes a function of applying an adhesive on a predetermined position of steel sheets. Two steel sheets were adhering to each other by applying a quick drying adhesive on an area having a diameter of 5 mm at the positions of the fixing parts $F_A$ and $F_B$ in FIGS. 2(a) and 2(b), relative to the final shape of the stator iron core, and the punch processing was performed on the outermost periphery (closed curved line L) in the final fifth process inside the mold. In this example, as illustrated in FIGS. 2(a) and 2(b), the fixing part $F_A$ is disposed at the position outside the outermost periphery of the iron core, the fixing part $F_B$ is disposed at the position inside the iron core, and the length of the line segment AB is as illustrated in FIGS. 2(a) and 2(b). Furthermore, a process without providing the fixing part $F_A$ or the fixing part $F_B$ was performed for comparison.

A motor with a rare earth magnet was manufactured by using the stator iron core that was manufactured as described above, and the motor efficiency at the rated output was measured. The results are illustrated in the following table 1. Furthermore, the details on the fixing parts $F_A$ and $F_B$ that are provided outside the outermost periphery of the stator iron core and inside the stator iron core, respectively, are also described in the table 1. As illustrated in the table 1, for the pair of the fixing parts $F_A$ and $F_B$ that are present at both sides of the closed curved line L, it was confirmed that a particularly high motor efficiency can be obtained when the number of pairs of the fixing parts $F_A$ and $F_B$, in which the length of the line segment AB is 400 times or less of the average sheet thickness of the steel sheets, is 0.5 or more per 100 mm in length of the closed curved line L that is specified in the present invention.

TABLE 1

Figure 2:
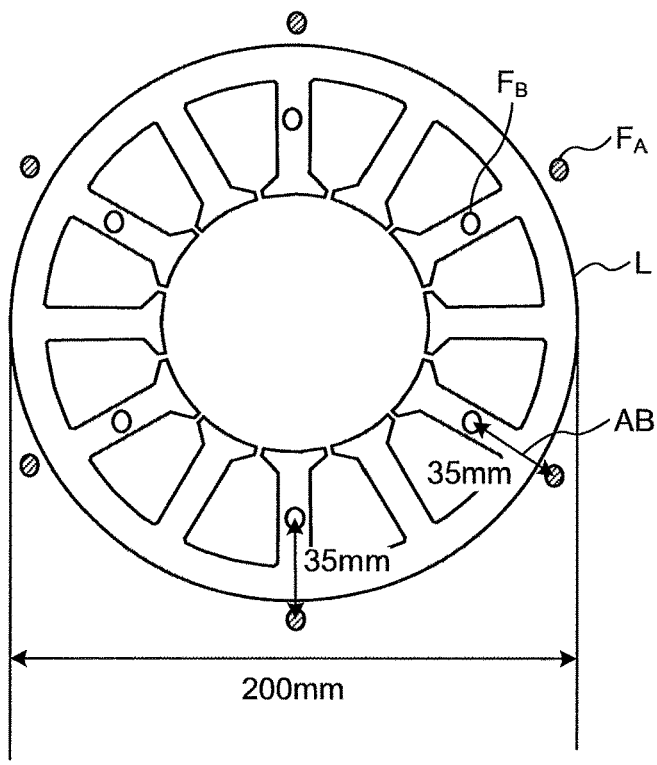
FIG. 2 is a schematic view illustrating a configuration of a stator iron core and fixing parts.
Figure 2:
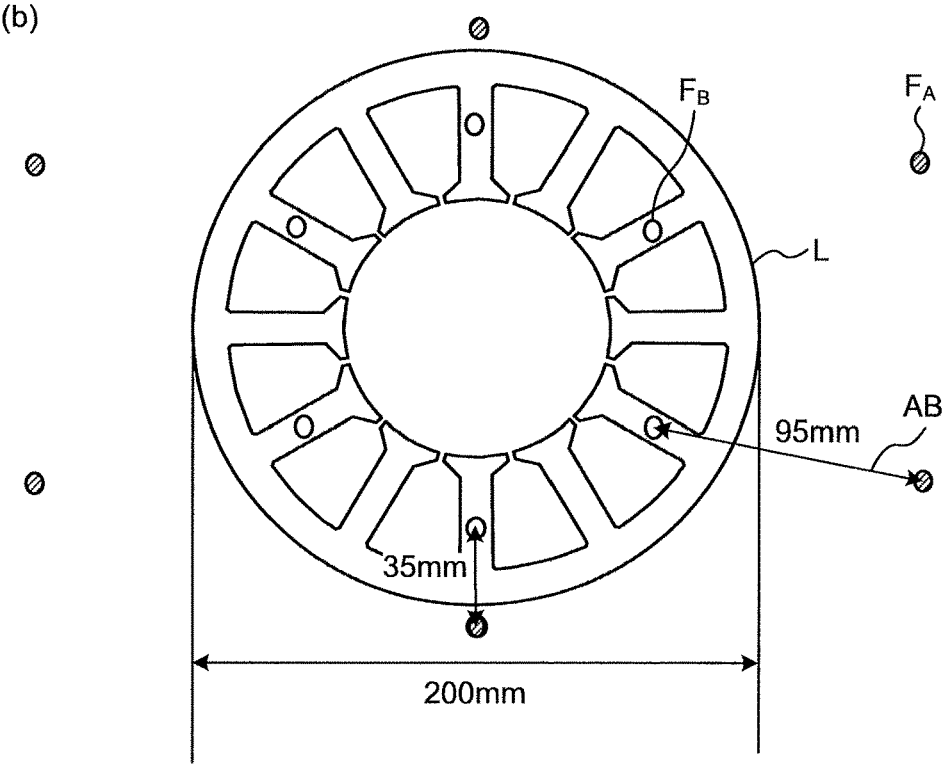

| Disposition of Fixing Parts | Fixing Part | Distance between $F_A$ and $F_B$ | Distance between $F_A$ and $F_B$/ Sheet Thickness | Number of Pairs | Number of pairs of $F_A$ and $F_B$/ L100 mm | Motor Efficiency (%) | Note |
|---|---|---|---|---|---|---|---|
| FIG. 2 (a) | Both $F_A$ and $F_B$ | 35 mm or less | 175 | 6 | 0.9 | 92.2 | Embodiment |
| | Only $F_A$ (No $F_B$) | — | — | 0 | 0.00 | 91.2 | Comparative Example |
| FIG. 2 (b) | Both $F_A$ and $F_B$ | 35 mm or less | 175 | 2 | 0.32 | 91.5 | Comparative Example |
| | | 95 mm or less | 475 | 6 | 0.96 | | |
| | Only $F_A$ (No $F_B$) | — | — | 0 | 0.00 | 91.2 | Comparative Example |
| | Only $F_B$ (No $F_A$) | — | — | 0 | 0.00 | 91.1 | Comparative Example |
| None | No $F_A$ or $F_B$ | — | — | 0 | 0.00 | 91.0 | Comparative Example |

Second Embodiment

Figure 3:
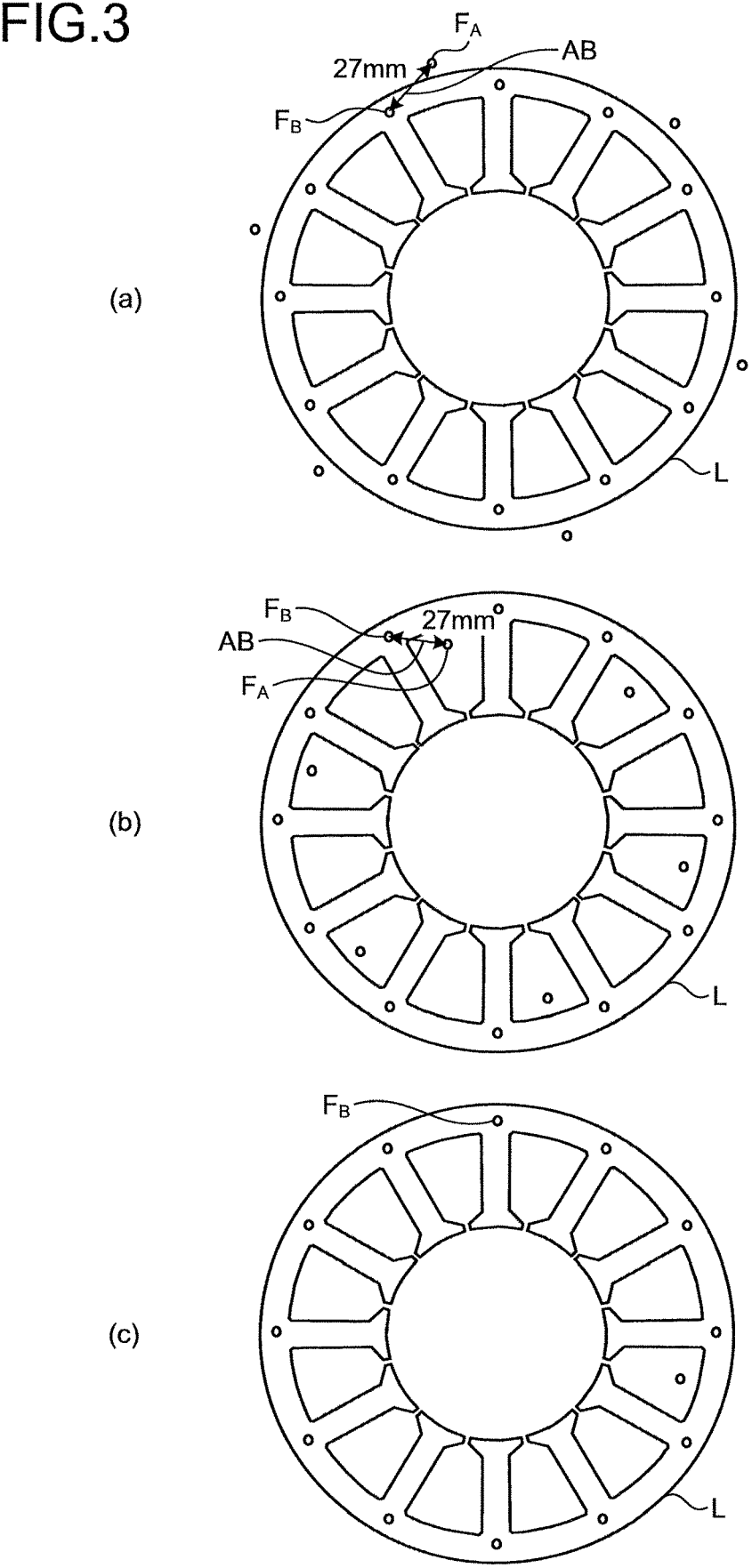
FIG. 3 is a schematic view illustrating a configuration of the stator iron core and the fixing parts.

A stator iron core (outer diameter 200 mm, 12 slots, teeth width 12 mm, and back yoke width 8 mm) for a brushless DC motor illustrated in FIGS. 3(a) to 3(c) was manufactured by simultaneously performing the punch processing on three electrical steel sheets having a sheet thickness of 0.15 mm and a sheet width of 210 mm using the device illustrated in FIG. 1, as well as by performing interlocking inside the mold. The punch processing was performed on the inner periphery of the iron core, the slot portion, and the outer periphery of the iron core, after the three steel sheets were fixed to each other by providing a round interlocking (diameter 1.2 mm and depth 0.10 mm) at the positions of the fixing parts $F_A$ and $F_B$ illustrated in FIGS. 3(a) to 3(c). An integrated stator iron core was manufactured by fitting the round interlocking projections to each other inside the mold, at the same time when the outer periphery of the iron core was punched out.

A motor with a rare earth magnet was manufactured by using the obtained stator iron core, and the motor efficiency at the rated output conditions was measured. As a result, the motor efficiency was 92.8% by the stator iron core (embodiment) illustrated in FIG. 3(a), 91.8% by the stator iron core (comparative example) illustrated in FIG. 3(b), and 91.5% by the stator iron core (comparative example) illustrated in FIG. 3(c). Thus, particularly excellent motor characteristics were obtained by the stator iron core illustrated in FIG. 3(a) under the conditions matching with the conditions of the present invention.

Third Embodiment

A stator iron core (outer diameter 250 mm, 12 slots, teeth width 15 mm, and back yoke width 11 mm) for a brushless DC motor illustrated in FIGS. 4-1 and 4-2 was manufactured, by simultaneously performing the punch processing on two electrical steel sheets having a sheet thickness of 0.20 mm and a sheet width of 260 mm using the device illustrated in FIG. 1, as well as by performing interlocking inside the mold. At the positions of the fixing parts $F_A$ and $F_B$ illustrated in FIGS. 4-1 and 4-2, two steel sheets were fixed to each other by spot welding the fixing part $F_A$ in the first process of the sequential processes performed inside the mold. Then, the punch processing was performed on the inner periphery of the iron core and the slot portion. The two steel sheets were then fixed to each other by providing a V-shaped interlocking (width: 1 mm, length: 2 mm, and depth: 0.3 mm) at a portion that finally serves as an iron core in the fourth process performed inside the mold. Then, the punch processing was performed on the outer periphery of the iron core, in the final fifth process, and the laminated steel sheets were temporarily integrated by fitting the V-shaped interlocking projections to each other using a punch lowering operation of the punch processing on the outermost periphery. An integrated stator iron core was manufactured by extracting the laminated steel sheets from the mold, by pressing the laminated steel sheets using the press machine, and by completely fitting the interlocking projections to each other. A motor with a rare earth magnet was manufactured by using the stator iron core, and the motor efficiency at the rated output conditions was measured.

FIG. 5 illustrates a relation of the number of pairs of the fixing parts $F_A$ and $F_B$ that satisfy the conditions of the present invention per 100 mm in circumference length of the closed curved line L, the ratio of the line segment AB relative to the average sheet thickness of the steel sheets, and the motor efficiency. As illustrated in FIG. 5, by controlling the ratio of the line segment AB relative to the average sheet thickness of the steel sheets, and the number, of pairs of the fixing parts $F_A$ and $F_B$ per 100 mm in length of the closed curved line L within the range specified in the present invention, it was confirmed that a high motor efficiency can be obtained.

Fourth Embodiment

Figure 6:
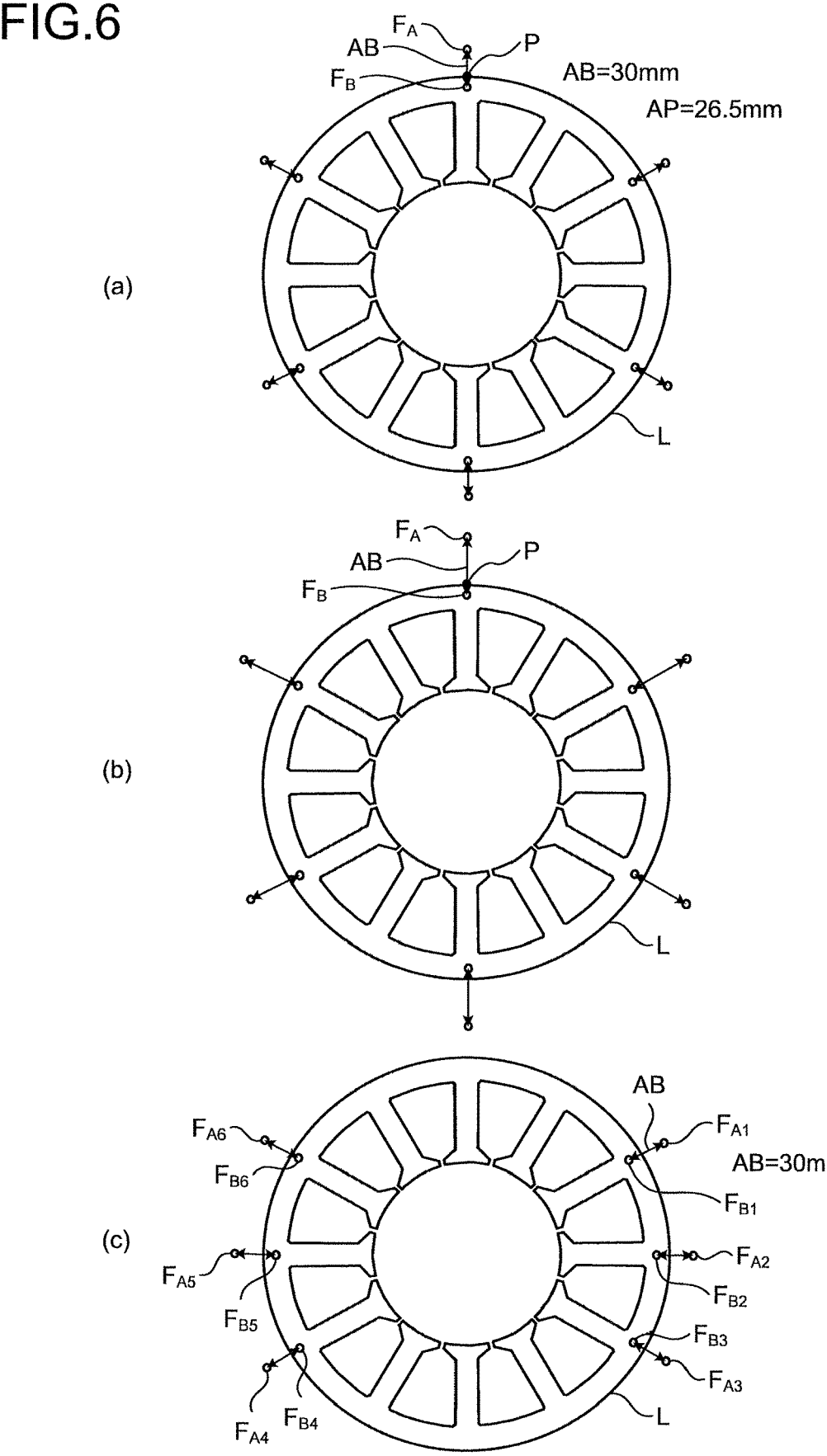
FIG. 6 is a schematic view illustrating a configuration of the stator iron core and the fixing parts.

A stator iron core (outer diameter 200 mm, 12 slots, teeth width 14 mm, and back yoke width 10 mm) for a brushless DC motor illustrated in FIGS. 4-1 and 4-2 was manufactured, by simultaneously performing the punch processing on three electrical steel sheets having a sheet thickness of 0.10, 0.15, and 0.20 mm, respectively, and a sheet width of 260 mm using the device illustrated in FIG. 1, as well as by performing interlocking inside the mold. At the positions of the fixing parts $F_A$, $F_B$, $F_{AN}$, and $F_{BN}$ (N=1 to 6) illustrated in FIGS. 6(a) to 6(c), the two steel sheets were fixed to each other by providing a V-shaped interlocking (width: 1 mm, length: 2 mm, and depth: 0.15 mm) on each of the fixing part $F_A$ as well as the fixing parts inside the iron core. Then, the punch processing was performed on the inner periphery of the iron core, the slot portion, and the outer periphery of the iron core. A stator iron core was then manufactured by fitting the V-shaped interlocking projections to each other using the punch lowering operation of the punch processing on the outermost periphery. Furthermore, in the above, the distance between the fixing parts $F_A$ and $F_B$ and the closed curved line L of the outermost periphery (minimum value of the distance between the fixing parts $F_A$ and $F_B$, and the closed curved line L of the outermost periphery) in the mode illustrated in FIG. 6(b) was changed relative to the basic position illustrated in FIG. 6(a). Furthermore, the distribution state of the pairs of the fixing parts $F_A$ and $F_B$ was changed in the mode illustrated in FIG. 6(c). In the mode illustrated in FIG. 6(c), intersections $P_N$ between the closed curved line L and the fixing parts $F_{AN}$ and $F_{BN}$ (N=1 to 6) were obtained. A sum of the longest arc length (first rank arc length) and the second longest arc length (second rank arc length) between the adjacent intersections $P_N$ was then calculated, and the ratio of the sum relative to the total length of the closed curved line L was obtained. A motor with a rare earth magnet was manufactured by using the stator iron core, and the motor efficiency at the rated output conditions was measured.

As illustrated in FIG. 7, by making the distance between the fixing parts $F_A$ and $F_B$ and the closed curved line L (shorter of the distance between the fixing part $F_A$ and the closed curved line L, and the distance between the fixing part $F_B$ and the closed curved line L) 250 times or less of the average sheet thickness of the steel sheets, a particularly high motor efficiency was obtained. Furthermore, as illustrated in FIG. 5, by controlling the number of pairs of the fixing parts $F_A$ and $F_B$ per 100 mm in length of the closed curved line L within the range specified in the present invention, a high motor efficiency was obtained. Furthermore, as illustrated in FIG. 8, in the above definition, by making a portion without the pair of the fixing parts $F_A$ and $F_B$ (sum of the first rank arc length and the second rank arc length) less than 50% of the total length of the closed curved line L, it was confirmed that the motor iron loss is improved.

The embodiments to which the invention made by the present inventors is applied have been described. It is to be understood that the present invention is not limited to the descriptions and drawings constituting a part of the disclosure of the present invention according to the present embodiment. That is, the other embodiments, examples, operational techniques, and the like that are made by those skilled in the art based on the present embodiment, are all included in the scope of the present invention.

The present invention can provide a punch processing method for a laminated iron core and a method for manufacturing a laminated iron core capable of manufacturing a laminated iron core with high productivity, while preventing the deterioration of the magnetic characteristics of the laminated iron core to the minimum.

REFERENCE SIGNS LIST

1 punch processing device
2a, 2b, 2c steel sheet
3a, 3b, 3c delivering device
4 pinch roll
5 press machine
6 mold
7, 7a, 7b, 7c punch
7d interlocking fastening punch
8 sheet holder
9 die
10 die hole
10a, 10b hole
21 lower mold
23 upper mold
25 interlocking projection

The invention claimed is:

1. A punch processing method for a laminated iron core, comprising:
   sequentially feeding the steel sheets to a mold; and
   performing a plurality of processes in the mold, including:
      fixing the steel sheets being stacked to each other at a first fixing part that is positioned outside a closed curved line corresponding to an outermost periphery of the laminated iron core and a second fixing part that is positioned in a portion that finally serves as the laminated iron core, such that the steel sheets include a number of pairs of the first fixing part and the second fixing part which satisfy a requirement that a length of a line segment connecting the first fixing part with the second fixing part is 400 times or less of an average sheet thickness of the steel sheets; and
      performing punch processing on the outermost periphery of the laminated iron core while the steel sheets are stacked, wherein
   the number of pairs is 0.5 or more per 100 mm in length of the closed curved line on average, and
   for the number of pairs of the first fixing part and the second fixing part which satisfy the requirement, when a shorter distance out of a distance between the first fixing part and the closed curved line and a distance between the second fixing part and the closed curved line is determined to be a distance between a fixing part and the closed curved line, an average value of the distance between the fixing part and the closed curved line is made to 250 times or less of the average sheet thickness of the steel sheets.

2. The punch processing method for the laminated iron core according to claim 1, wherein a method of fixing the steel sheets at the second fixing part is a method of fixing using a caulking projection to form a laminated iron core.

3. A method for manufacturing a laminated iron core, the method comprising:
   manufacturing a laminated iron core by laminating and integrating a steel sheet to which punch processing is performed using the punch processing method for the laminated iron core, including:
   sequentially feeding the steel sheets to a mold; and
   performing a plurality of processes in the mold, including:
      fixing the steel sheets being stacked to each other at a first fixing part that is positioned outside a closed curved line corresponding to an outermost periphery of the laminated iron core and a second fixing part that is positioned in a portion that finally serves as the laminated iron core, such that the steel sheets include a number of pairs of the first fixing part and the second fixing part which satisfy a requirement that a length of a line segment connecting the first fixing part with the second fixing part is 400 times or less of an average sheet thickness of the steel sheets; and
      performing punch processing on the outermost periphery of the laminated iron core while the steel sheets are stacked, wherein
   the number of pairs is 0.5 or more per 100 mm in length of the closed curved line on average, and for the number of pairs of the first fixing part and the second fixing part which satisfy the requirement, when a shorter distance out of a distance between the first fixing part and the closed curved line and a distance between the second fixing part and the closed curved line is determined to be a distance between a fixing part and the closed curved line, an average value of the distance between the fixing part and the closed curved line is made to 250 times or less of the average sheet thickness of the steel sheets.

4. A method for manufacturing a laminated iron core according to claim 3, wherein a method of fixing the steel sheets at the second fixing part is a method of fixing using a caulking projection to form a laminated iron core.

* * * * *